(12) United States Patent
Karandikar et al.

(10) Patent No.: US 8,960,815 B2
(45) Date of Patent: Feb. 24, 2015

(54) SWITCHGEAR ENCLOSURE WITH IMPROVED DOOR ASSEMBLY

(75) Inventors: Harshavardhan M. Karandikar, Longwood, FL (US); Radim Dolezal, Brno (CZ); Robert Karnbach, Lake Mary, FL (US); Rahul Pawar, Lake Mary, FL (US); Patrick Fischer-Carne, New Smyrna Beach, FL (US)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/981,044

(22) PCT Filed: Jan. 25, 2012

(86) PCT No.: PCT/US2012/022503
§ 371 (c)(1),
(2), (4) Date: Jul. 23, 2013

(87) PCT Pub. No.: WO2012/103183
PCT Pub. Date: Aug. 2, 2012

(65) Prior Publication Data
US 2013/0293076 A1    Nov. 7, 2013

Related U.S. Application Data

(60) Provisional application No. 61/436,515, filed on Jan. 26, 2011.

(51) Int. Cl.
*E05C 7/06*        (2006.01)
*H02B 1/46*        (2006.01)
(Continued)

(52) U.S. Cl.
CPC .. *H02B 1/46* (2013.01); *H02B 1/28* (2013.01); *H02B 1/38* (2013.01); *A47B 96/00* (2013.01)
USPC .......................................................... 312/222

(58) Field of Classification Search
CPC .. E05B 65/462; E05B 65/467; E05B 65/0003
USPC ........... 312/215–218, 222, 223.1; 292/4, 5, 6, 292/7, 11, 48, 56, 57, 59, 68, 116, 118
See application file for complete search history.

(56) References Cited

U.S. PATENT DOCUMENTS 2,486,460 A    11/1949   Bonenberger
3,175,873 A *   3/1965   Blomquist et al. ............ 312/296
(Continued)

FOREIGN PATENT DOCUMENTS

DE          19939614 C1    9/2001
FR          2934871 A1     2/2010
(Continued)

OTHER PUBLICATIONS

ABB Limited, MV Indoor Air Insulated Switchgear, Model Unisafe MV Vacuum Circuit Breaker, Model VD4,Brochure, 1VDS22004-YN 007/2005/1000, Nashik India, Dated 2005.
(Continued)

*Primary Examiner* — Matthew Ing
(74) *Attorney, Agent, or Firm* — Robert P. Nupp (57) ABSTRACT

A multipoint door latch apparatus for use in a switchgear enclosure comprising a door assembly, a latch handle and latch handle mechanism, a plurality of catch tabs affixed to the face frame of the enclosure. Top, side, and bottom latch bars in latch bar chambers are provided, each having at least one latch tooth and being linked by latch bar linkages such that a displacement of one latch bar along results in the same magnitude displacement in the other two latch bars. The catch tabs or latch teeth, or both, are tapered to provide a suitable seal between the door assembly and the enclosure when the door assembly is latched.

8 Claims, 13 Drawing Sheets

(51) Int. Cl.
*H02B 1/28* (2006.01)
*H02B 1/38* (2006.01)
*A47B 96/00* (2006.01)

(56) References Cited

U.S. PATENT DOCUMENTS

| | | | |
|---|---|---|---|
| 4,146,994 A * | 4/1979 | Williams | 49/367 |
| 4,674,305 A | 6/1987 | Dirks | |
| 4,794,206 A | 12/1988 | Weinstein | |
| 4,862,324 A | 8/1989 | Kalvaitis et al. | |
| 4,864,466 A | 9/1989 | Gasparetto | |
| 5,820,170 A | 10/1998 | Clancy | |
| 5,905,244 A | 5/1999 | Smith et al. | |
| 5,938,248 A | 8/1999 | Vickers et al. | |
| 5,986,211 A | 11/1999 | Greer et al. | |
| 6,047,501 A | 4/2000 | Zeitler | |
| 6,086,121 A | 7/2000 | Buckland | |
| 6,152,497 A | 11/2000 | Vickers et al. | |
| 6,170,928 B1 | 1/2001 | Eardley et al. | |
| 6,264,252 B1 | 7/2001 | Clancy | |
| 6,305,511 B1 | 10/2001 | McCann et al. | |
| 6,382,741 B1 | 5/2002 | McCann et al. | |
| 6,523,870 B2 | 2/2003 | Schlack | |
| 6,561,604 B2 | 5/2003 | Leccia et al. | |
| 6,641,182 B2 | 11/2003 | Schlack et al. | |
| 6,688,656 B1 | 2/2004 | Becken | |
| 6,746,092 B2 | 6/2004 | Leccia et al. | |
| 6,907,830 B2 | 6/2005 | Guinan et al. | |
| 6,971,322 B2 | 12/2005 | DuBois et al. | |
| 6,981,724 B2 | 1/2006 | Denys | |
| 7,234,785 B1 | 6/2007 | McCann et al. | |
| 7,325,887 B2 | 2/2008 | McCann et al. | |
| 7,363,789 B2 | 4/2008 | Squier | |
| 7,558,052 B1 | 7/2009 | Coomer et al. | |
| 7,631,526 B2 | 12/2009 | Squier | |
| 7,646,613 B2 | 1/2010 | Ligtenberg et al. | |
| 7,686,207 B1 | 3/2010 | Jeffs | |
| 7,871,137 B2 | 1/2011 | Schulz et al. | |

FOREIGN PATENT DOCUMENTS

| | | |
|---|---|---|
| WO | 2004101364 A2 | 11/2004 |
| WO | 2012103183 A1 | 8/2012 |

OTHER PUBLICATIONS

ABB s.r.o, PowerCube PB, Installation and maintenance instructions, 1VLM000037 Rev.-cs Dec. 17, 2007, Czech Republic, Dated 2007.

International Search Report for Application PCT/US2012/022503 (mailed Jun. 13, 2012).

International Prelim. Report on Patentability (Ch. 1) for Application PCT/US2012/022503 (issued Jul. 30, 2013).

* cited by examiner

SWITCHGEAR ENCLOSURE WITH IMPROVED DOOR ASSEMBLY

FIELD OF INVENTION

The present application is directed to arc resistant metal enclosures for switchgear, and more particularly, to a switchgear enclosure having a multipoint door latch apparatus. The present application is also directed to methods for providing a switchgear enclosure that is resistant to arc fault damage utilizing the multipoint door latch apparatus.

BACKGROUND

It is common to house switchgear in metal enclosures that are resistant to arc fault damage. Arc-resistant switchgear enclosures must withstand high internal pressure due to expanding gases and high temperatures generated by an internal arc fault. Arc-resistance test standards require that no arc gases escape the switchgear enclosure compartments. This problem is particularly acute in the smaller switchgear compartments such as the circuit breaker compartment.

The interface between the switchgear compartment door and the switchgear frame is a relatively weak point that may potentially allow arc fault gases to escape. To prevent this, a door design is needed that is held tightly against the frame along all of its edges. Also, for ease-of-use, it is preferable to provide a latched door. However, it is a challenge to have a latched door that can be held tightly against the frame and that will resist the high internal pressures of an arc fault.

SUMMARY

Described herein is a multipoint door latch apparatus for use in a switchgear enclosure. The apparatus comprises a door assembly having inside and outside plates, and inner, outer, top, and bottom edges having flanges extending inwardly, and top, outer, bottom and inner brackets that are secured to the inside plate so as to form a substantially square loop on the interior side of the inside plate. The door assembly is pivotally attached to the face frame of the enclosure along its inner edge. The top, outer, and bottom flanges and the top, outer, and bottom brackets cooperate to form latch bar chambers. A gasket is mounted on the brackets. A plurality of catch tabs are affixed to the face frame of the enclosure.

Additionally, the apparatus has top, side, and bottom latch bars that each have at least one latch tooth and that are each seated in a latch bar chamber. The apparatus also includes a latch handle having a latched position and an open position and a latch handle mechanism configured to displace one of the latch bars a latching distance along the line of the longitudinal axis of the latch bar as the latch handle is moved between the latched position and the open position. Two latch bar linkages mechanically connect to the top and bottom ends of the side latch bar to the outer ends of the top and bottom latch bars, respectively, such that displacement of one latch bar by the latch handle mechanism causes a corresponding displacement of the same magnitude in the other two latch bars. A latch status visual indicator is affixed to a latch bar, and an interlock mechanism is configured to prevent the latch handle from being moved to a latched position when the door assembly is in an open position.

Moreover, the catch tabs and latch teeth are tapered such that the door assembly is firmly pressed against the face frame when the door assembly is closed and the latch handle is moved to the latched position. And, the gasket provides a seal, when the door assembly is closed and the latch handle is moved to the latched position, sufficient to prevent gases from escaping during an arc fault.

The present application also describes a method for providing a switchgear enclosure that is resistant to arc fault damage, comprising the steps of providing a switchgear box having a case and a face frame, providing a plurality of catch tabs affixed to the face frame, and providing the door assembly and latch assembly described herein.

BRIEF DESCRIPTION OF THE DRAWINGS

In the accompanying drawings, structural embodiments are illustrated that, together with the detailed description provided below, describe exemplary embodiments of a multipoint door latch apparatus for use in a switchgear enclosure. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

The principles disclosed in this application are applicable to various switchgear enclosures. For example, the principles discussed below can be applied to medium voltage switchgear breaker boxes, and the like.

Figure 1:
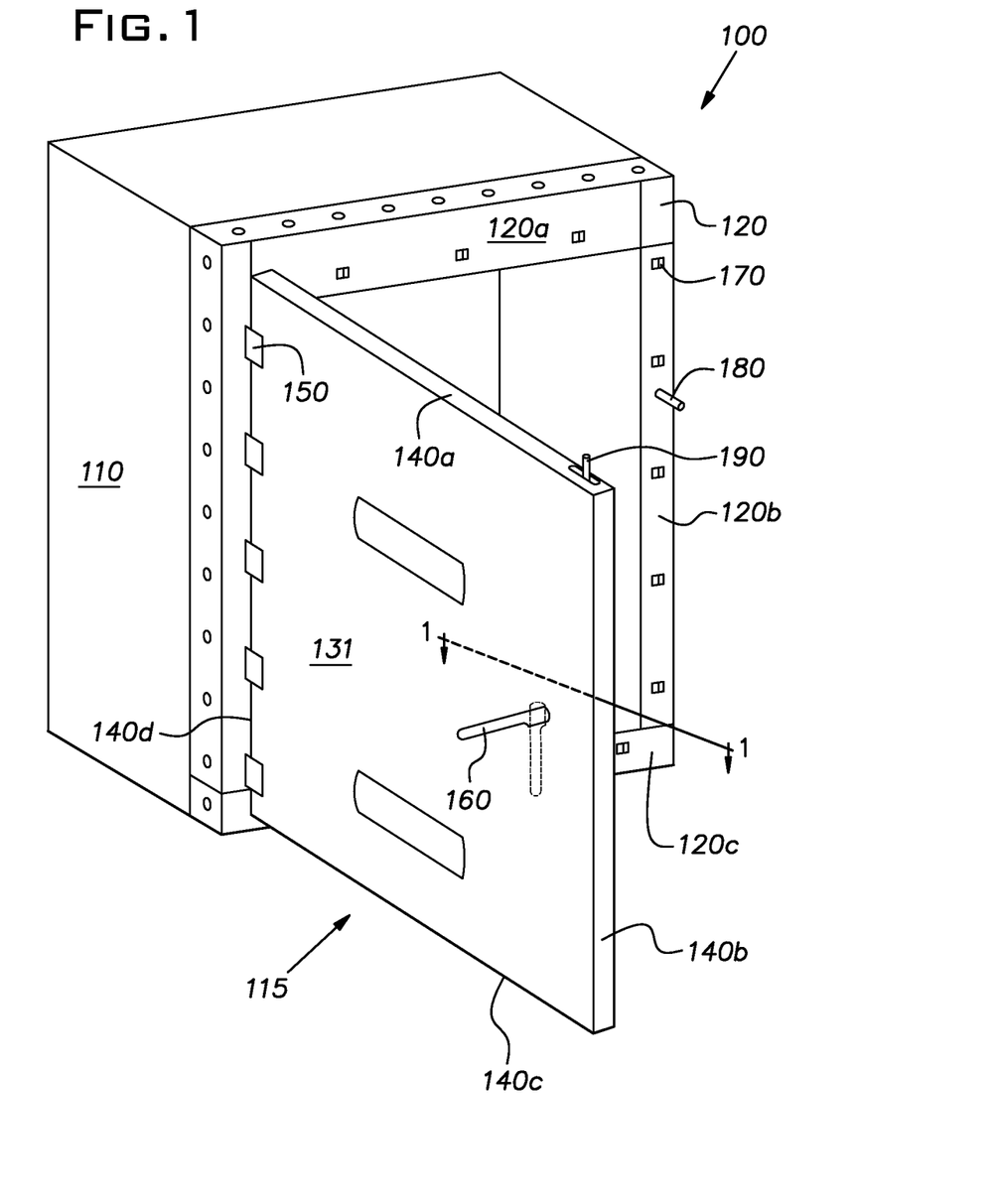
FIG. 1 is a perspective view of a switchgear enclosure having a partially opened door assembly.
Figure 2A:
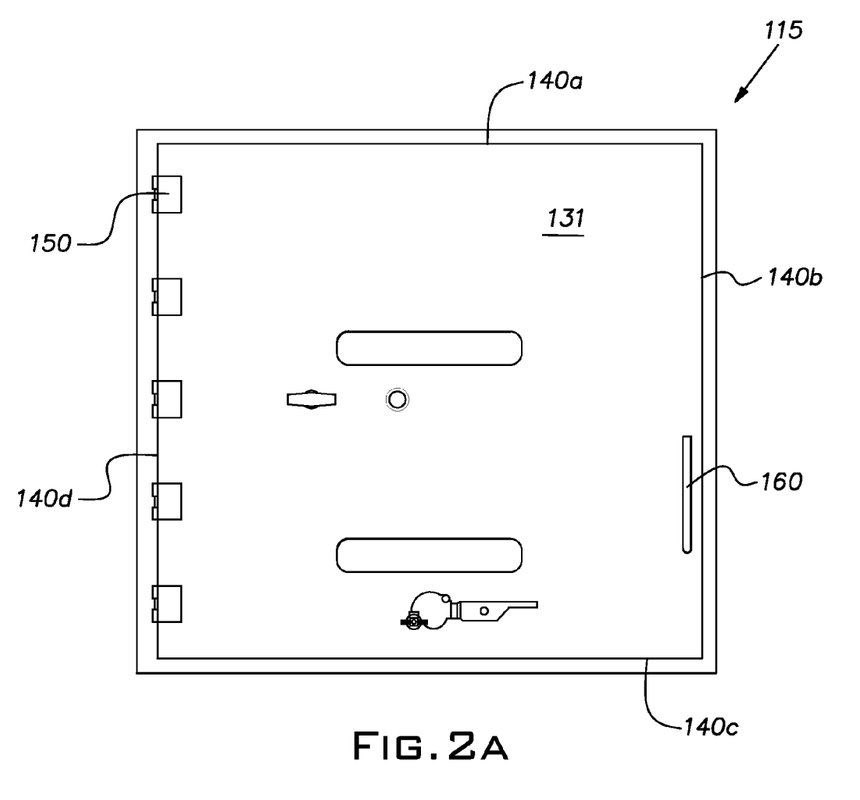
FIG. 2A is a front elevational view of the outside surface of the door assembly shown in FIG. 1.

Referring to FIGS. 1 and 2A, a switchgear enclosure 100 embodied in accordance with the present invention is shown. Switchgear enclosure 100 generally includes an enclosure case 110 and a door assembly 115. The enclosure case 110 has a face frame 120 and defines an interior space for holding switchgear, such as a circuit breaker. Access to the interior space is provided through an enlarged opening closed by the door assembly 115. The door assembly 115 is pivotally attached to the enclosure case 110 and is movable between open and closed positions. Door assembly 115 includes a door structure 130 comprised of an outside plate 131 and an inside plate 132 (shown in FIG. 2B), and having top, outer, bottom, and inner edges 140a-d, respectively. The outside and inside plates 131, 132 are rigid and may be formed from metal. Door structure 130 is pivotally attached to face frame 120 at inner edge 140d. In the embodiment shown, door structure 130 is attached to the face frame by five hinges 150, although any suitable pivotal attachment means may be used. Latch handle 160 is affixed to door structure 130 proximate outer edge 140b, although other suitable latch handle configurations may be used.

With continued reference to FIGS. 1 and 2A, catch tabs 170 are attached to face frame 120 and extend forwardly from front surfaces 120a,b,c thereof. In the embodiment shown, three catch tabs 170 extend from the upper front surface 120a, five catch tabs 170 extend from the side front surface 120b, and three catch tabs 170 extend from the lower front surface 120c. However, any suitable number of catch tabs 170 may be affixed to face frame 120 and still fall within the scope of the present application. In general, catch tabs 170 are located on the face frame at positions that correspond with the positions of the latch teeth of the latch bars, described in more detail below, such that the catch tabs 170 are capable of engaging the latch teeth when door assembly 115 is closed and when the latch handle is in the latched position (the position shown in FIG. 1 using a dashed line). Handle lock pin 180 is affixed to face frame 120 in a suitable location to trip the latch handle interlock mechanism, described in detail below.

A latch status visual indicator 190 is affixed to one or more of the latch bars (described below) and arranged such that it protrudes though a slotted hole in a visible surface of door structure 130 such as, in this example, top edge 140a. In general, the latch status visual indicator is any bar, pin, or other indicator means that is integral with or affixed to a latch bar and that protrudes through a surface of the door structure such that it provides an indication of the relative position of the latch bar to which it is affixed. Preferably, latch status indicator 190 is sufficiently rigid and strong itself, and in its mechanical connection to the latch bar, to allow for it to serve as a means for manually moving the latch bar to which it is affixed. Suitably, latch status indicator 190 may be a metal pin.

Figure 2B:
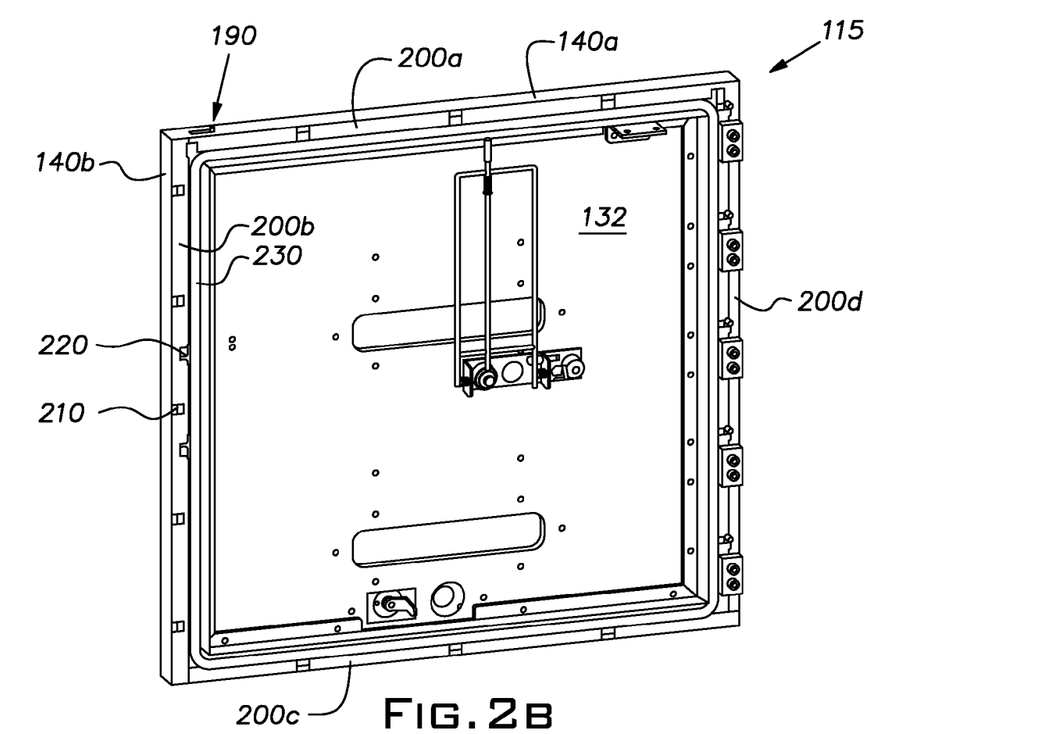
FIG. 2B is a perspective view of the inside surface of the door assembly shown in FIG. 1.
Figure 2C:
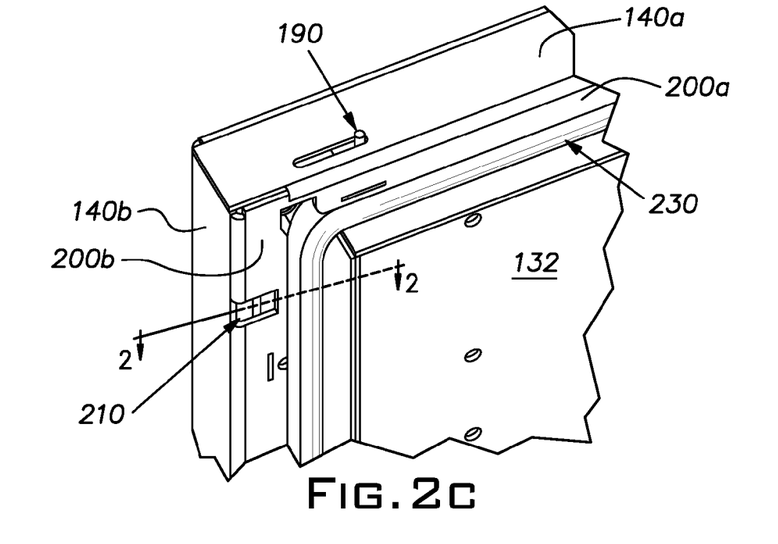
FIG. 2C is a partial exploded view of the inside surface of the door assembly shown in FIG. 2B, showing a latch status visual indicator.

FIGS. 2B and 2C illustrate the inside portion of door assembly 115. As shown, the top, outer, bottom, and inner edges 140a-d of door assembly 115 are inwardly flanged, so as to form top, outer, bottom, and inner flanges 200a-d, respectively. Referring now also to FIG. 5B, door assembly 115 also includes L-shaped top, outer, bottom and inner brackets 202 that are secured to inside plate 132. The top, outer, and bottom flanges 200a-c and the top, outer, and bottom brackets 202 cooperate to help define top, outer, and bottom latch bar chambers 132, respectively (best shown in FIG. 5B) that house the latch bars, described in more detail below. Each of the top, outer, and bottom flanges 200a-c has one or more apertures 210 formed therein. The number of apertures 210 is the same as the number of catch tabs 170, shown in FIG. 1. The location of the apertures 210 is such that each aperture allows corresponding catch tabs 170 to access the latch teeth of the latch bars, described in more detail below, when door assembly 115 is in the closed position.

Additionally, one or more of the flanges 200a-c contains an interlock aperture 220 that allows handle lock pin 180, affixed to the face frame and shown in FIG. 1, to access and trip the latch handle interlock mechanism, (described in more detail below) and thereby allow latch handle 160 to be moved into a latched position from an open position (shown in FIG. 1 using a continuous line). A gasket 230 (in one or more pieces or sections) is mounted to the brackets 202 so as to form a substantially square loop on the interior side of the door structure 130. A narrow gap is formed between the gasket 230 and inner edges of the flanges 200. This placement of the gasket 230 and its sizing is such that, when the door assembly 115 is closed and latched, the gasket 230 provides a seal sufficient to prevent gases from escaping during an arc fault.

Figure 3A:
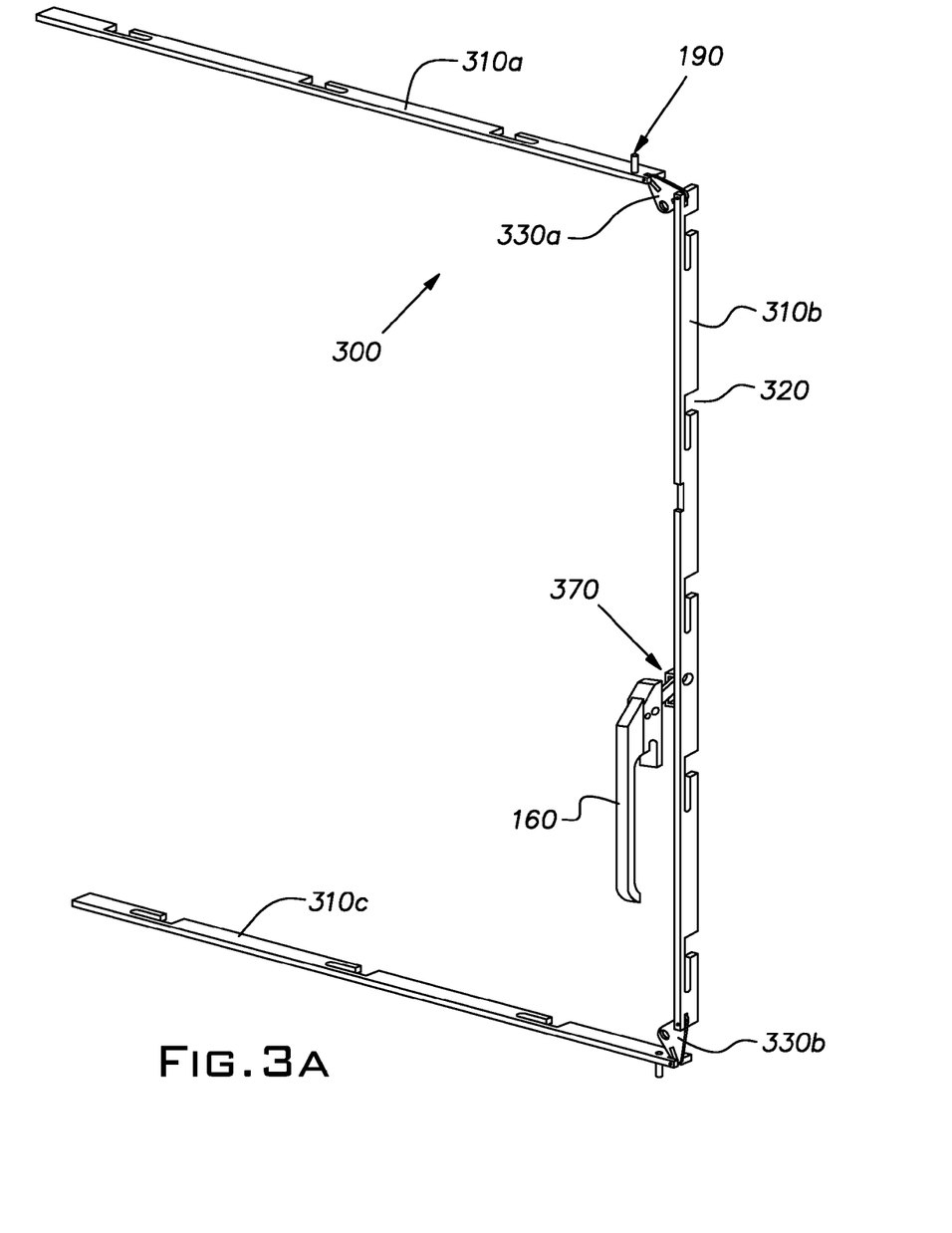
FIGS. 3A and 3B are perspective views of a latch bar arrangement of the door assembly shown in FIG. 1.
Figure 3B:
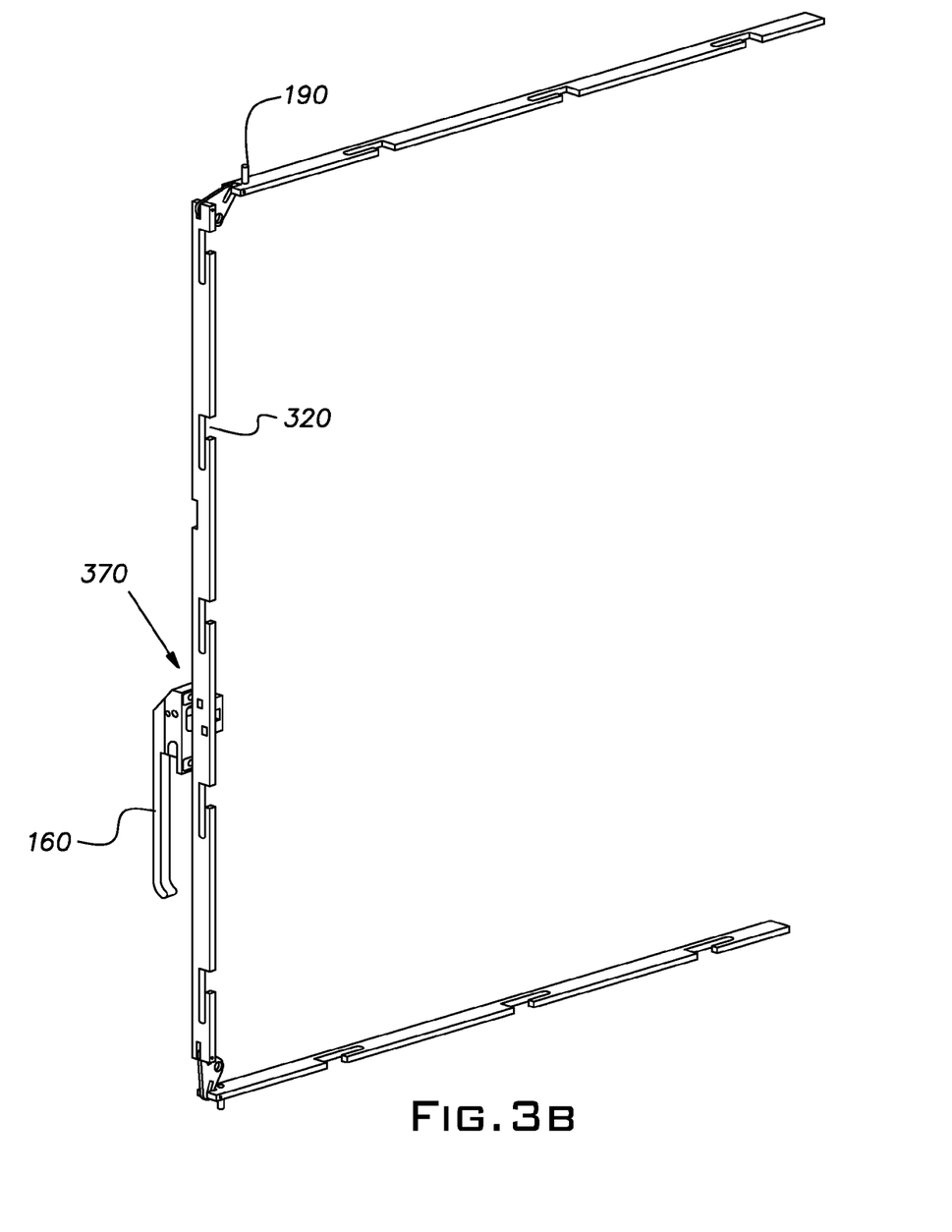

The door assembly 115 also includes a latch bar assembly 300, which is shown in FIGS. 3A and 3B. In general, latch bar assembly 300 comprises top, side, and bottom latch bars 310a-c, respectively. Each latch bar 310 is a longitudinal member that is relatively flat (i.e., has width that is greater than depth) and includes at least one latch tooth 320. With cross-reference to FIG. 2B, latch bar arrangement 300 is arranged such that top, side, and bottom latch bars 310a-c are situated within the top, outer, and bottom latch bar chambers that are defined by top, outer, and bottom flanges 200a-c, respectively. Moreover, side latch bar 310b is situated such that it has a top end proximate top edge 140a of door assembly 115 and a bottom end proximate bottom edge 140c. Top latch bar 310a is situated such that it has an inner end proximate inner edge 140d and an outer end proximate the outer edge 140b. Bottom latch bar 310c is situated such that it has an inner end proximate inner edge 140d and an outer end proximate outer edge 140b.

Figure 3C:
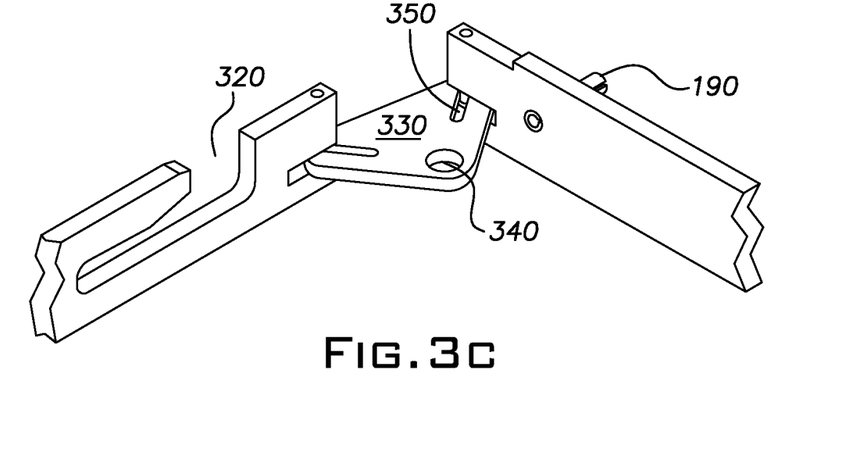
FIGS. 3C and 3D are partial exploded views of the latch bar arrangement of FIGS. 3A and 3B, showing a latch bar linkage.
Figure 3D:
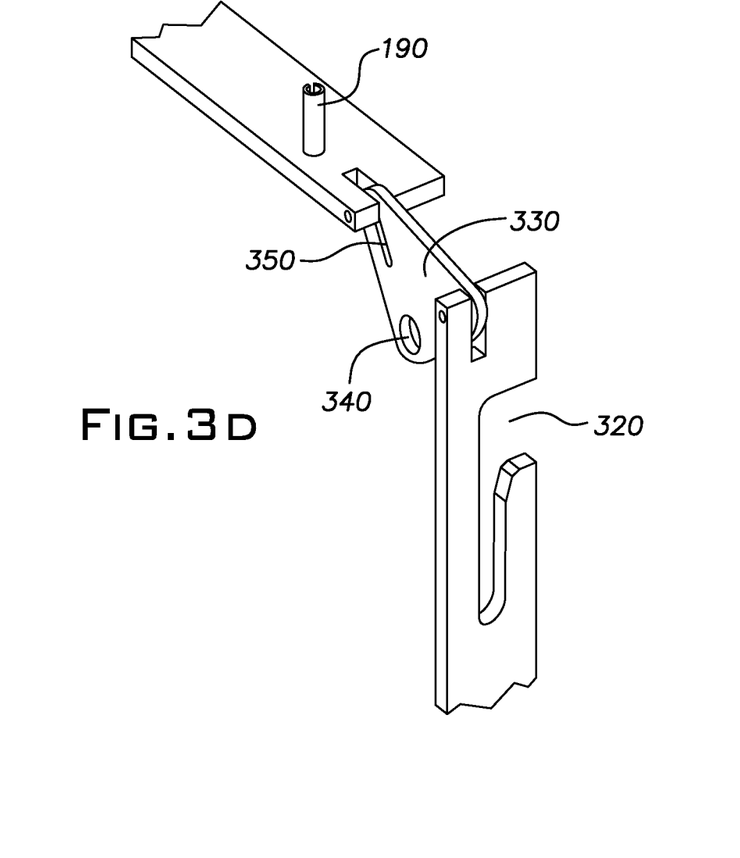
Figure 3E:
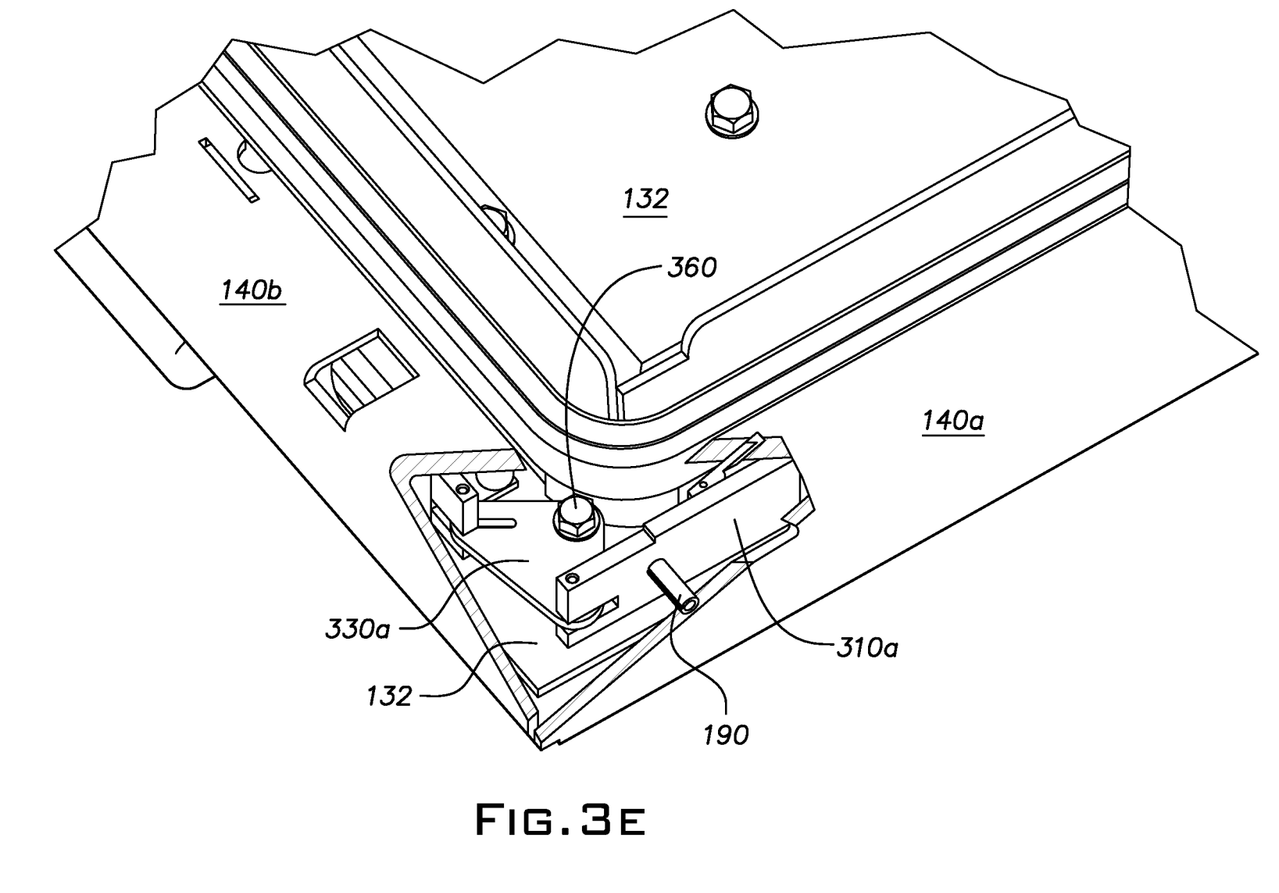
FIGS. 3E and 3F are partial exploded cutaway views of a corner section of the door assembly shown in FIG. 2B, showing a latch bar linkage.

With continued reference to FIGS. 3A and 3B, and with additional reference to FIGS. 3C and 3D, it may be seen that latch bars 310 are mechanically connected by latch bar linkages 330. In general, latch bar linkages 330 are mechanical connectors that function to allow the displacement of a first latch bar to cause approximately the same magnitude displacement in the latch bar(s) to which it is directly attached, and to change the direction of the displacement (as used herein, the term "displacement" refers to movement of a component along a line parallel to the longitudinal axis of the component). Preferably, latch bar linkages 330 are configured such that the displacement of a first latch bar causes a displacement in the latch bar(s) to which it is directly attached that is of the same magnitude, but that is in a direction that is perpendicular to the direction of the first latch bar. In one non-limiting example, latch bar linkages 330 are flat rigid pieces containing a first through-hole 340 that allows for a rotatable connection to the door structure 130. For example, with reference to FIGS. 3E and 3F, the latch bar linkage 330a is shown attached to inside plate 132 of door assembly 115 via a sliding pivot point 360, which allows rotation of the link during displacement of the latch bars. In addition, latch bar linkages 330 contain at least two slots 350 that allow for a slidable connection, such as a pin connection, with two latch bars. It should be appreciated that other configurations and designs of latch bar linkages 330 are contemplated herein. In the embodiment shown, the outer end of top latch bar 310a is connected to the top end of side latch bar 310b by latch bar linkage 330a and the outer end of bottom latch bar 310c is connected to the bottom end of side latch bar 310b by latch bar linkage 330b.

Figure 3F:
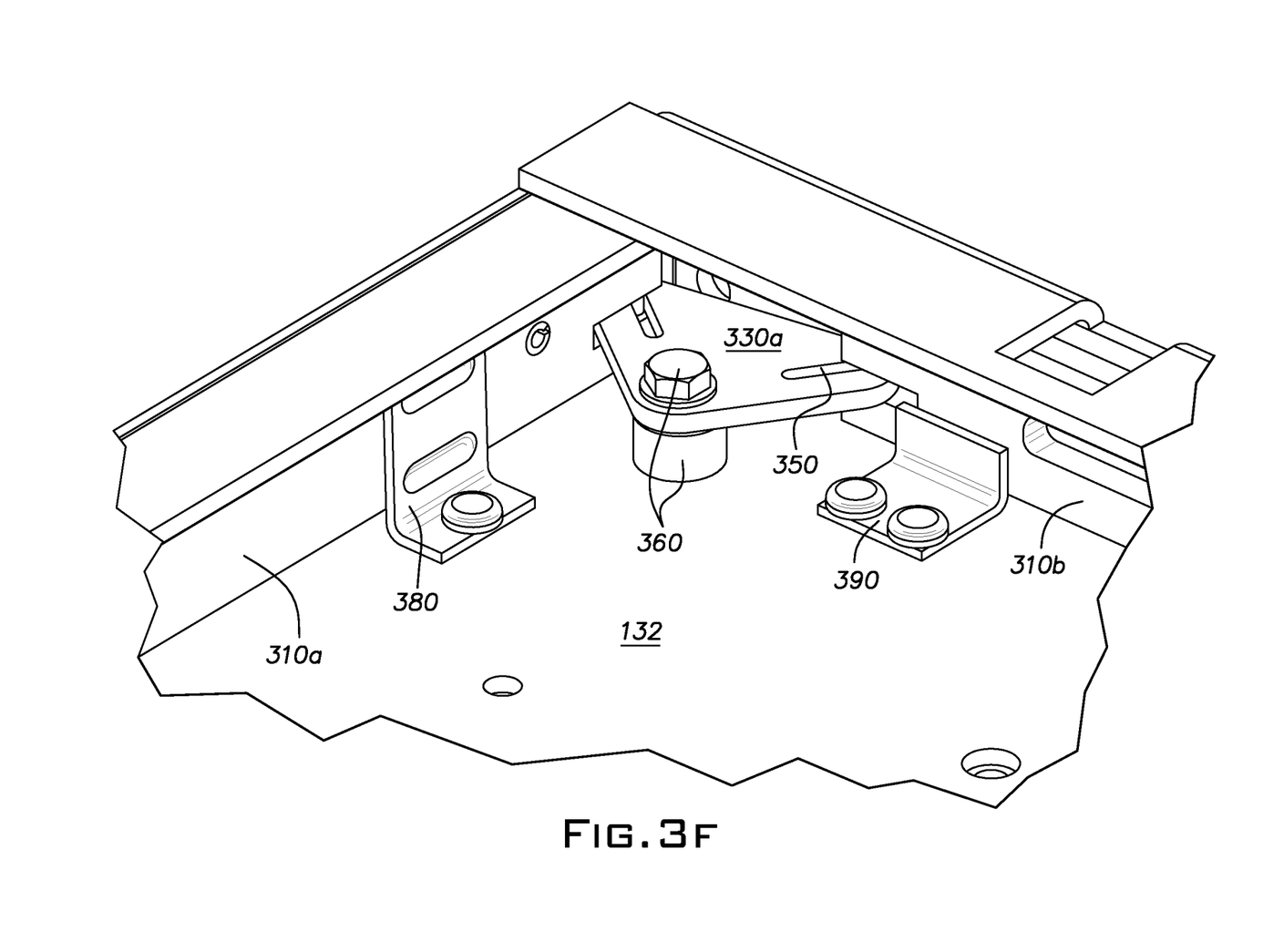

Also illustrated in FIG. 3F are latch bar guides 380, 390. In general, latch bar guides 380, 390 are rigid components affixed to inside plate 132 and in slidable contact with latch bars 310 so as to maintain the cross-sectional placement of the latch bar 310 and to prevent angular movement of the latch bars.

Figure 3G:
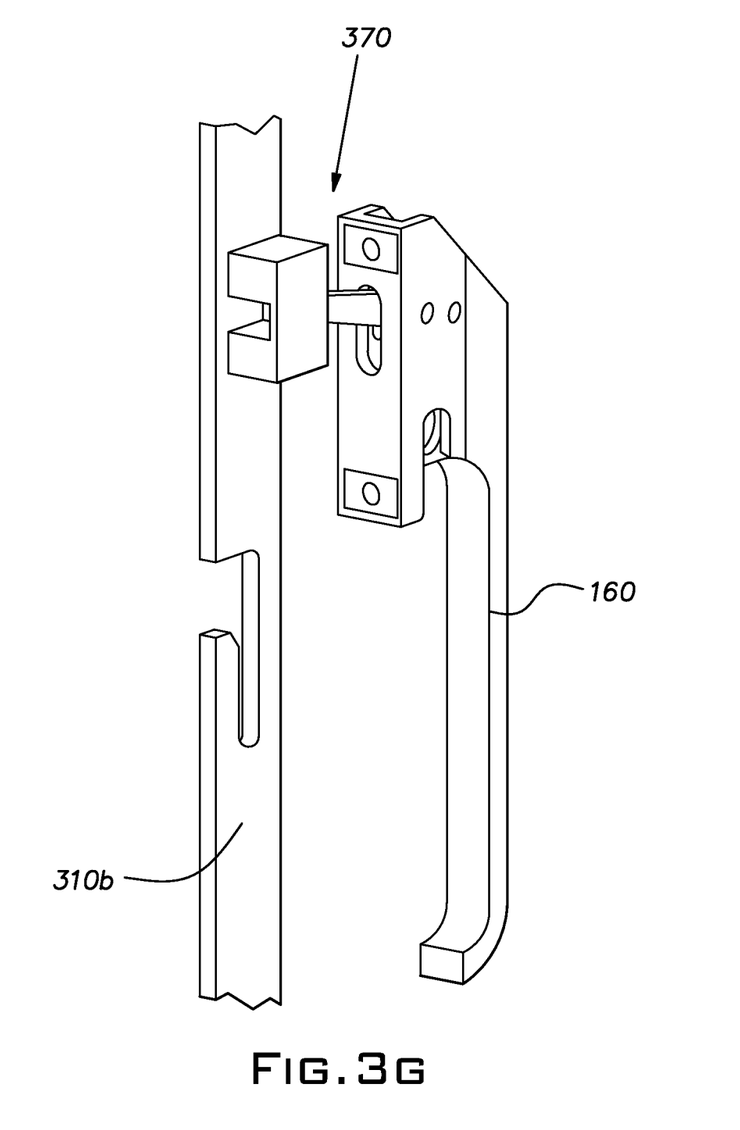
FIG. 3G is a partial exploded view of the latch bar arrangement of FIGS. 3A and 3B, showing the latch handle and the latch handle mechanism.

With reference to FIGS. 3A, 3B and 3G, latch handle mechanism 370 is illustrated. In general, latch handle mechanism 370 may be any handle mechanism capable of causing a suitable displacement of a latch bar 310. As shown, latch handle mechanism 370 is generally a lever-type mechanism that is connected at one end to latch handle 160 and at another end to latch bar 310. Preferably, latch handle mechanism 370 is connected to side latch bar 310b. In operation, when a user (not shown) moves latch handle 160 from an open position (not shown) to a latched or closed position (shown), latch handle mechanism 370 causes side latch bar 310b to be displaced upwardly (vertically) a latching distance, along the vertical axis of side latch bar 310b. A latching distance is generally a pre-determined distance calculated to result in a secure latch between latch teeth 320 and catch tabs 170. In alternative embodiments, latch handle mechanism 370 may be connected to top or bottom latch bars 310a,c. Furthermore, through operation of latch bar linkages 330, the vertical displacement (of a latching distance) of side latch bar 310b causes the horizontal displacement (of a latching distance) of top and bottom latch bars 310a,c.

Figure 4:
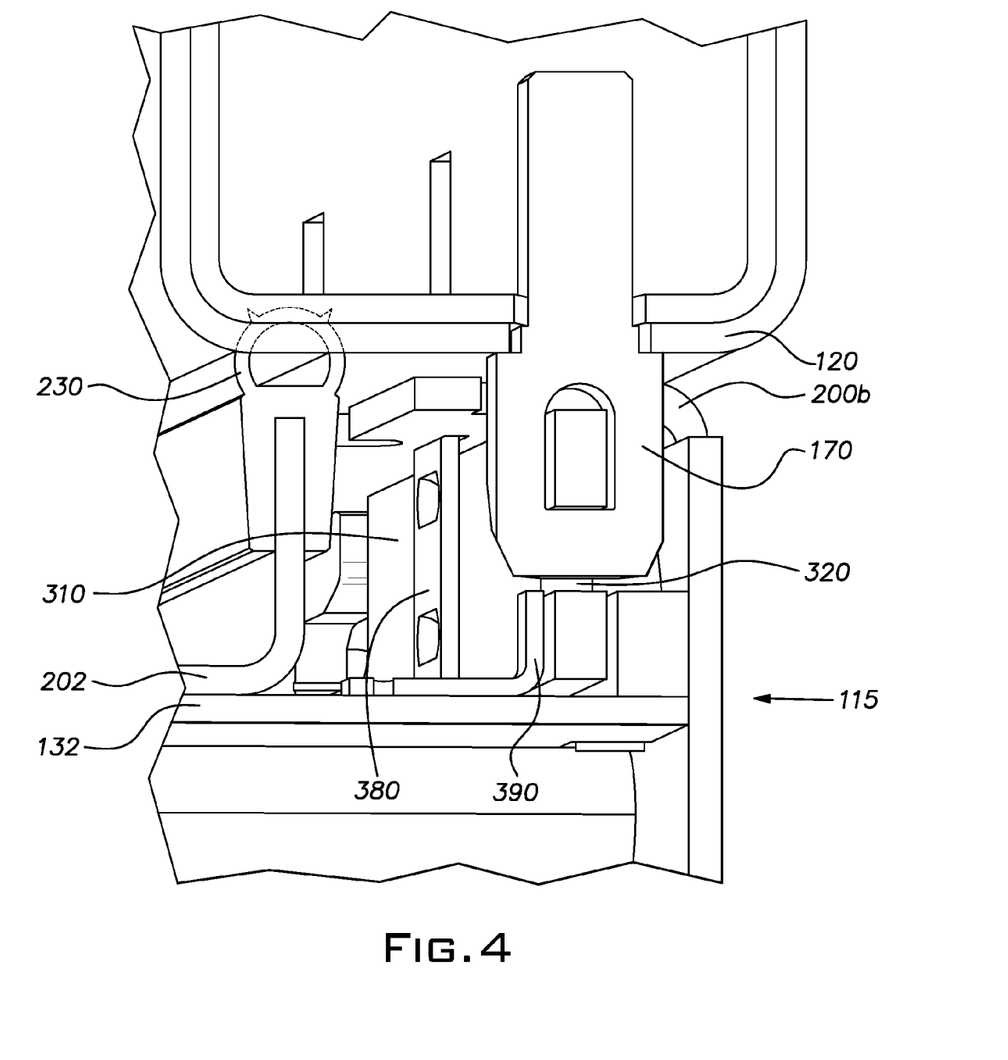
FIG. 4 is a horizontal section taken along line 2-2 in FIG. 2C.

The cross section shown in FIG. 4 illustrates a latch connection between catch tab 170 and latch tooth 320. As shown, when latch handle 160 (not shown) is moved to a latched position, latch bar 310 is displaced from its previous (unlatched) position to a latched position (shown), such that latch tooth 320 engages catch tab 170 and, through the operation of the taper on either latch tooth 320 or catch tab 170, or both, flange 200 and gasket 230 are firmly pressed against face plate 120, forming a seal that is resistant to arc-fault damage. A non-limiting example of arc-fault damage includes permanent or partial deformation of any of the top, outer and bottom flanges 200a-c. In general, methods for adjusting the resistance to arc-fault damage according to the present application include but are not limited to adjusting the number of latch teeth/catch tabs and adjusting the taper of either the latch teeth or catch tabs, or both.

Figure 5A:
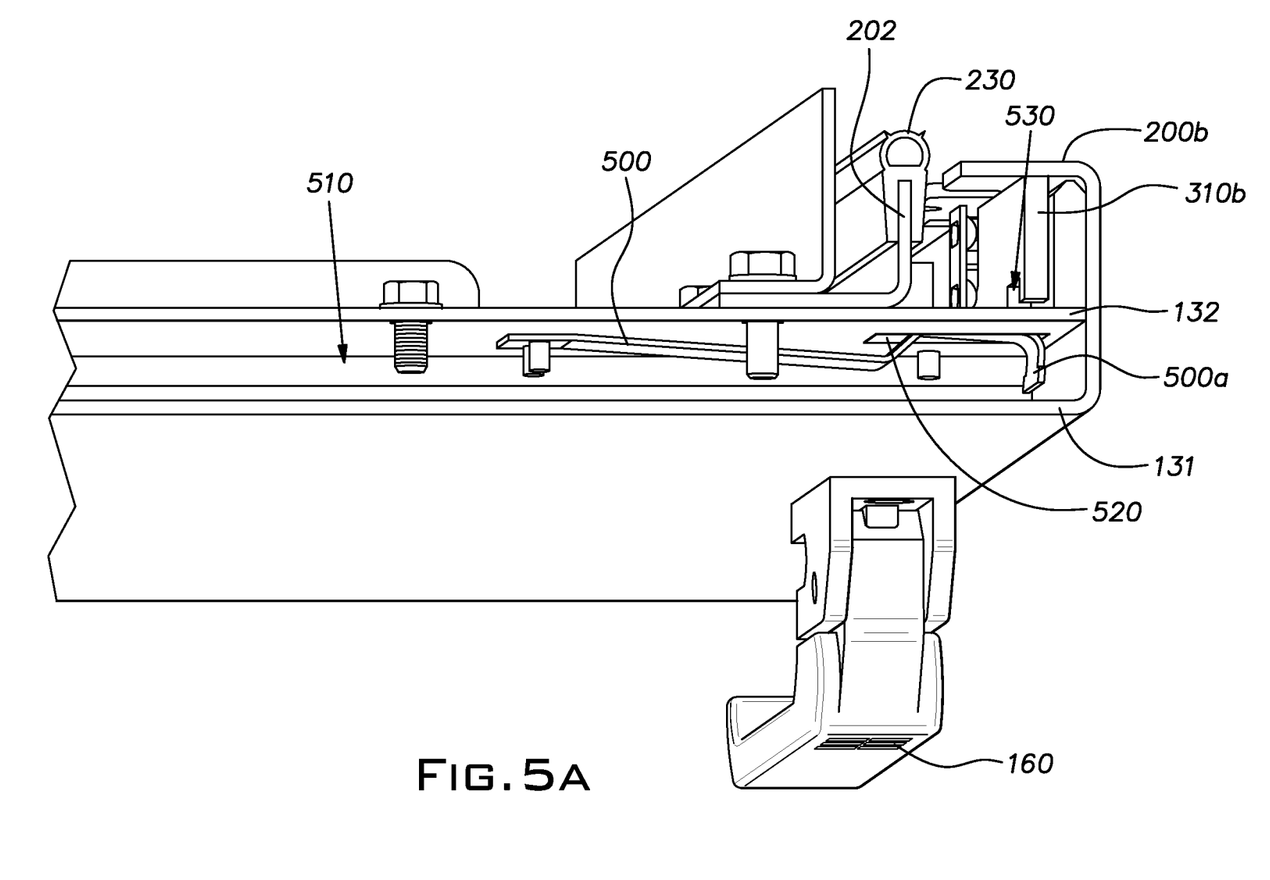
FIGS. 5A, B, and C are horizontal sections taken along line 1-1 in FIG. 1.
Figure 5B:
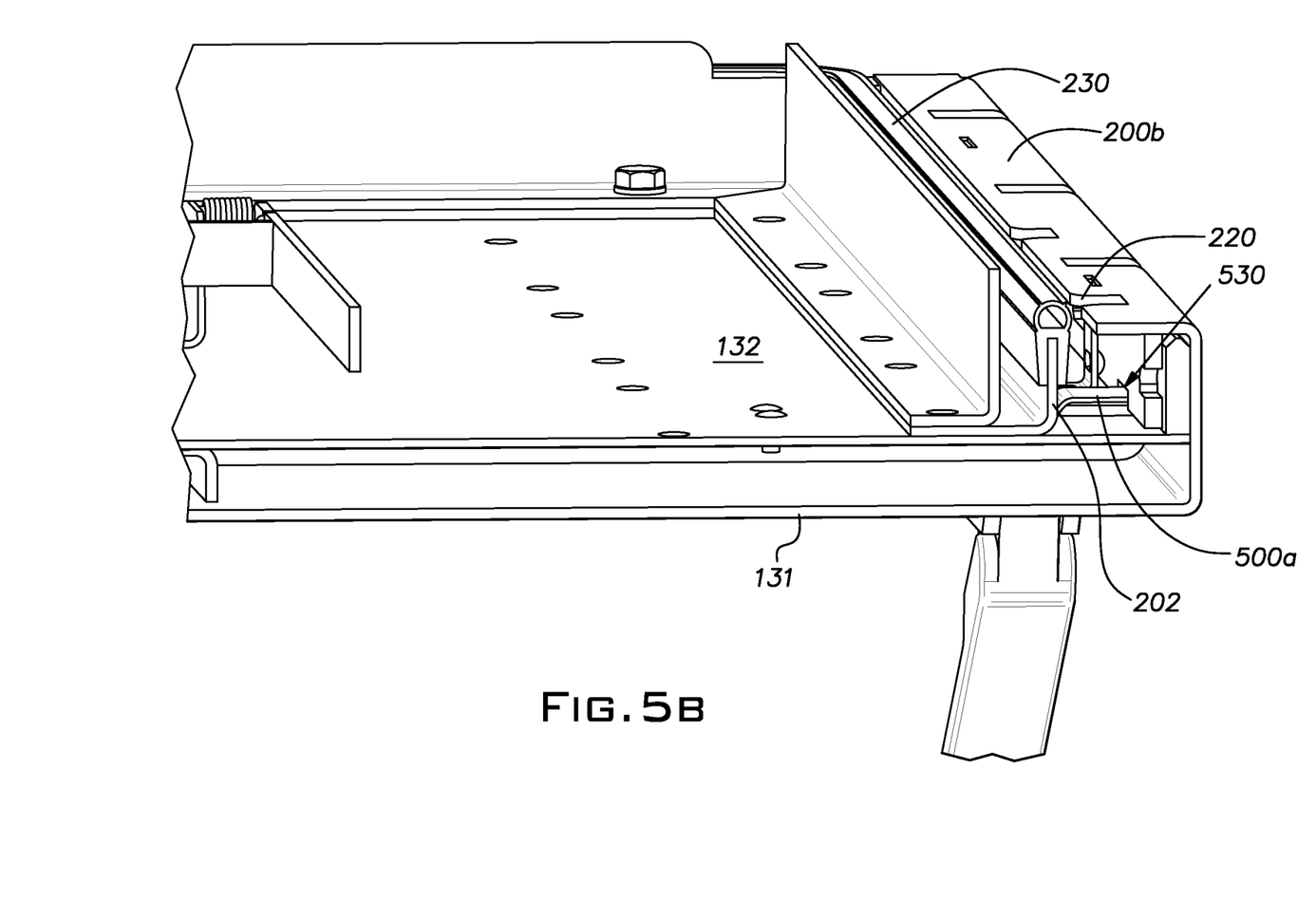
Figure 5C:
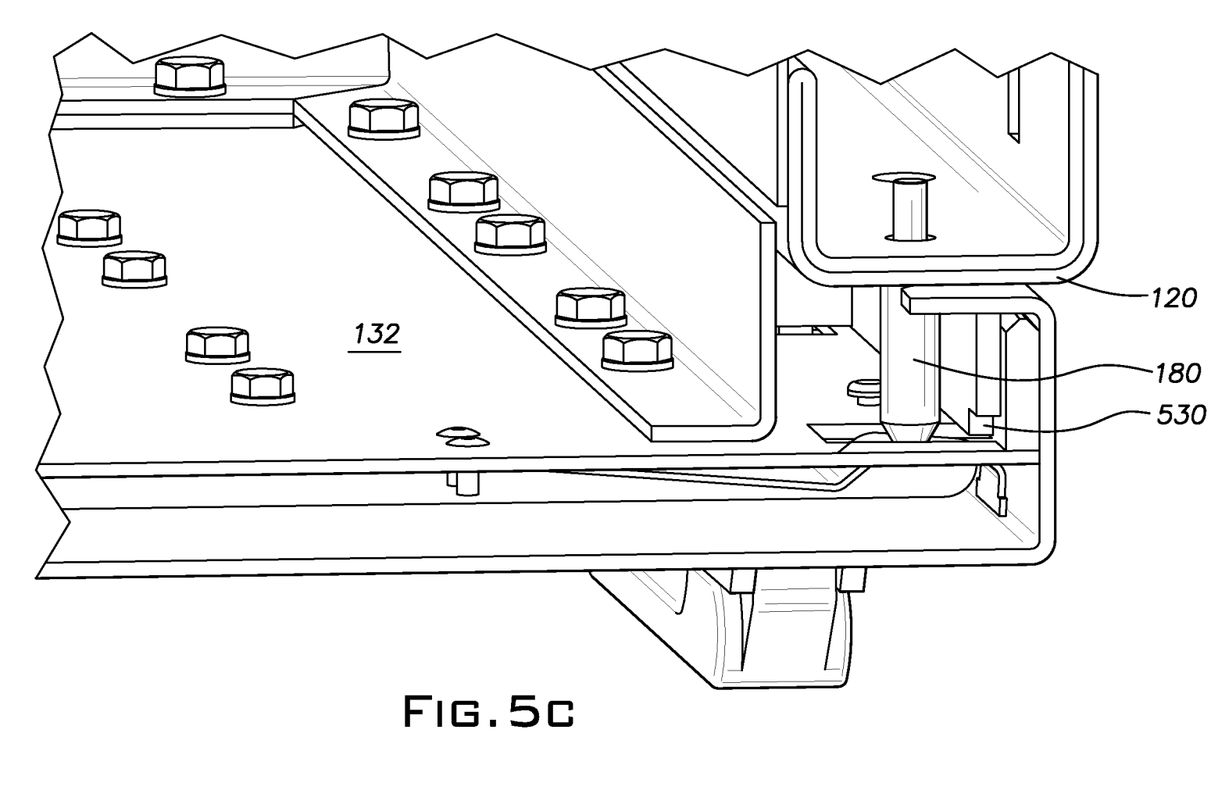

In FIGS. 5A, 5B, and 5C, is shown an embodiment of an interlock mechanism that is configured to prevent latch handle 160 from being moved to a latched position when door assembly 115 is open, according to the present invention. Preferably, the interlock mechanism comprises a spring element 500, the majority of which is located in chamber 510. Chamber 510 is a space bounded by inside and outside plates 132, 131 of door assembly 115. Spring element 500 is configured such that a portion 500a is biased to protrude through an aperture 520 in inside plate 132 of door assembly 115. Without any obstruction, spring element portion 500a protrudes through aperture 520 and extends a distance into a latch bar chamber—e.g., the outer latch bar chamber that is defined by outer flange 200b and the proximate L-shaped brackets 202—and into notch 530 that is formed in the adjacent latch bar (e.g., side latch bar 310b), thereby preventing movement of the latch bar and therefore latch handle 160, as shown in FIG. 5B. In other words, once latch handle 160 is moved to an open position and portion 500a is biased into notch 530, latch handle 160 is thereafter prevented from moving to any other position.

With reference to FIG. 5C, and cross-referencing FIGS. 1 and 5B, it may be seen that, when door structure 130 is closed, handle lock pin 180 extends through interlock aperture 220, making contact with and pushing spring element portion 500a, such that portion 500a is backed out of notch 530 and allowing the user (not shown) to move handle latch 160 into a latched position (or any other position).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A switchgear enclosure that is resistant to arc fault damage comprising:
a case and a face frame that defines an opening;
a door assembly comprising
inside and outside plates, and inner, outer, top, and bottom edges;
top, outer, and bottom flanges extending inwardly from the top, outer, and bottom edges, such that the flanges are substantially parallel to the face frame when the door is in a closed position;
top, outer, bottom and inner brackets that are secured to the inside plate so as to form a substantially square loop on the interior side of the inside plate, and wherein the top, outer, and bottom flanges and the top, outer, and bottom brackets cooperate to form top, outer, and bottom latch bar chambers,
a gasket mounted on the top, outer, bottom, and inner brackets;
a latch handle having a latched position and an open position;
a plurality of catch tabs affixed to the face frame;
a top latch bar seated in the top latch bar chamber and having an end proximate the inner edge of the door assembly and an end proximate the outer edge;
a side latch bar seated in the outer latch bar chamber and having an end proximate the top edge of the door assembly and an end proximate the bottom edge;
a bottom latch bar seated in the bottom latch bar chamber and having an end proximate the inner edge of the door assembly and an end proximate the outer edge;
a latch handle mechanism configured to displace one of the latch bars a latching distance along the line of the longitudinal axis of the latch bar as the latch handle is moved between the latched position and the open position;
two latch bar linkages;
a latch status visual indicator affixed to a latch bar; and
an interlock mechanism configured to prevent the latch handle from being moved to a latched position when the door assembly is in an open position;
wherein the door assembly is pivotally attached to the face frame along the inner edge,
wherein the side, top, and bottom latch bars each have at least one latch tooth,
wherein the outer end of the top latch bar is mechanically connected to the top end of the side latch bar by a latch bar linkage and the outer end of the bottom latch bar is mechanically connected to the bottom end of the side latch bar by a latch bar linkage, such that displacement of one latch bar by the latch handle mechanism causes a corresponding displacement of the same magnitude in the other two latch bars, wherein the catch tabs and latch teeth are tapered such that the door assembly is firmly pressed against the face frame when the door assembly is closed and the latch handle is moved to the latched position, and wherein the gasket provides a seal, when the door assembly is closed and the latch handle is moved to the latched position, sufficient to prevent gases from escaping during an arc fault.

2. The switchgear enclosure in claim 1, wherein the latch handle mechanism is configured to displace the side latch bar.

3. The switchgear enclosure in claim 1, wherein the latch handle mechanism is configured to displace the bottom latch bar.

4. The switchgear enclosure in claim 1, wherein the top and bottom latch bars each contain three to five latch teeth, and wherein the side latch bar contains five to nine latch teeth.

5. A method for providing a switchgear enclosure that is resistant to arc fault damage, comprising the steps of:

providing a switchgear box comprising a case and a face frame;

providing a plurality of catch tabs affixed to the face frame;

providing a door assembly comprising inside and outside plates, and inner, outer, top, and bottom edges;

top, outer, and bottom flanges extending inwardly from the top, outer, and bottom edges, such that the flanges are substantially parallel to the face frame when the door is in a closed position;

top, outer, bottom and inner brackets that are secured to the inside plate so as to form a substantially square loop on the interior side of the inside plate, and wherein the top, outer, and bottom flanges and the top, outer, and bottom brackets cooperate to form top, outer, and bottom latch bar chambers, a gasket mounted on the top, outer, bottom, and inner brackets;

providing a latch assembly comprising a latch handle having a latched position and an open position;

a top latch bar seated in the top latch bar chamber and having an end proximate the inner edge of the door assembly and an end proximate the outer edge;

a side latch bar seated in the outer latch bar chamber and having an end proximate the top edge of the door assembly and an end proximate the bottom edge;

a bottom latch bar seated in the bottom latch bar chamber and having an end proximate the inner edge of the door assembly and an end proximate the outer edge;

a latch handle mechanism configured to displace one of the latch bars a latching distance along the line of the longitudinal axis of the latch bar as the latch handle is moved between the latched position and the open position;

two latch bar linkages;

a latch status visual indicator affixed to a latch bar; and an interlock mechanism configured to prevent the latch handle from being moved to a latched position when the door assembly is in an open position;

wherein the door assembly is pivotally attached to the face frame along the inner edge, wherein the side, top, and bottom latch bars each have at least one latch tooth, wherein the outer end of the top latch bar is mechanically connected to the top end of the side latch bar by a latch bar linkage and the outer end of the bottom latch bar is mechanically connected to the bottom end of the side latch bar by a latch bar linkage, such that displacement of one latch bar by the latch handle mechanism causes a corresponding displacement of the same magnitude in the other two latch bars, wherein the catch tabs and latch teeth are tapered such that the door assembly is firmly pressed against the face frame when the door assembly is closed and the latch handle is moved to the latched position, and wherein the gasket provides a seal sufficient when the door assembly is closed and the latch handle is moved to the latched position, such that gases are prevented from escaping during an arc fault.

6. The method of claim 5, wherein the latch handle mechanism is configured to displace the side latch bar.

7. The method of claim 5, wherein the latch handle mechanism is configured to displace the bottom latch bar.

8. The method of claim 5, wherein the top and bottom latch bars each contain three to five latch teeth, and wherein the side latch bar contains five to nine latch teeth.

* * * * *